Dec. 3, 1957     J. W. MATSON     2,814,869
CUTTING TOOL WITH WORKPIECE RETAINING MEANS
Filed Nov. 2, 1955

INVENTOR.
JOHN W. MATSON
BY Ray S Pyle
atty

United States Patent Office 2,814,869
Patented Dec. 3, 1957

2,814,869

CUTTING TOOL WITH WORKPIECE RETAINING MEANS

John W. Matson, Waterville, N. Y., assignor to Utica Drop Forge & Tool Corp., a corporation of New York Application November 2, 1955, Serial No. 544,440

2 Claims. (Cl. 30—124)

The present invention relates generally to cutting tools embodying a pair of movable jaws with which gripping members are associated in a novel manner to hold the object cut by the tool.

More specifically stated, the invention comprehends a wire cutting tool equipped with yieldable cooperating gripping members to hold therebetween the piece of wire severed by the tool.

This invention is an improvement over the device taught in the patent to Steegmuller 2,302,810. As set forth by Steegmuller, the primary purpose of his invention is to equip a cutting tool having side cutting edges with cooperating gripping members associated with the jaws of the tool for catching the severed workpiece members. Such a device is very desirable for preventing the severed ends of wires and similar workpieces from flying and causing eye injury or falling into inaccessible parts of equipment and causing operating difficulties. Furthermore, holding of the cut workpiece member in effect provides a third hand and eliminates the need for frequently picking workpieces from the floor or work bench. Steegmuller protected his yieldable gripping members by substantially confining the yieldable material within the confines of a hollowed out portion in the jaws. Thus the gripping members are fully protected from injury, or casual separation from the tool itself, incident to careless handling of the tool under all conditions, and particularly when the tool is carelessly thrown into a tool box or the like.

Applicant has been manufacturing the Steegmuller plier for several years, and has found it to be very satisfactory. However, under extreme conditions of use and over long periods of continued use, applicant has found that the yieldable material tends to separate from the surfaces to which it is bonded, particularly in the region of the cutting edge. At the cutting edge the thickness of the body of resilient material is the least, and consequently is stressed to a much greater degree than that portion of the resilient body further removed from the cutting edge. Such separation of the bond holding the resilient material near the cutting edge produces a small fault into which foreign matter can collect and also produces a leverage action which gradually works the separation point further from the cutting edge and eventually results in the complete failure of the bond and loss of the yieldable gripping material from the jaw area. The tool remains effective as a conventional cutting tool thereafter, but loses the very desirable gripping action. According to the present invention, the strength of the union between the yieldable gripping material and the rigid metal of the cutting jaws has been vastly improved, and the point of greatest stress has been eliminated, and therefore incipient separation at the cutting edge is prevented. This is the primary object of the present invention.

Another object of this invention is to provide a superior method and the equipment for molding the non-stressed type of yieldable gripping member directly into the jaws of the cutting tool.

Other objects and a fuller understanding of the invention may be had by referring to the following specification and claims, taken in conjunction with the accompanying drawing, in which:

Before entering into a detailed description of what is herein illustrated, it is to be understood that the present invention is capable of use with various kinds of cutting tools or shears, whether pivoted or separately powered, and while described in connection with a wire cutting tool, its general application is contemplated by the claims.

Figure 1:
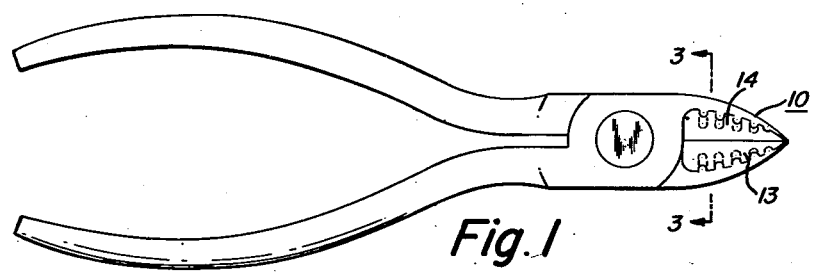
Figure 1 is a plan view of the tool embodying the present invention.
Figure 2:
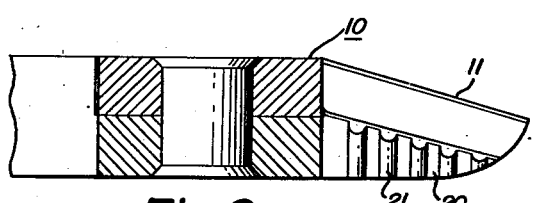
Figure 2 is a longitudinal sectional view through the tool, and thus in effect is a side view of one jaw only.
Figure 3:
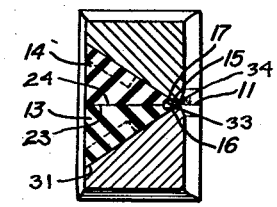
Figure 3 is a section taken along the line 3—3 of Figure 1.
Figure 4:
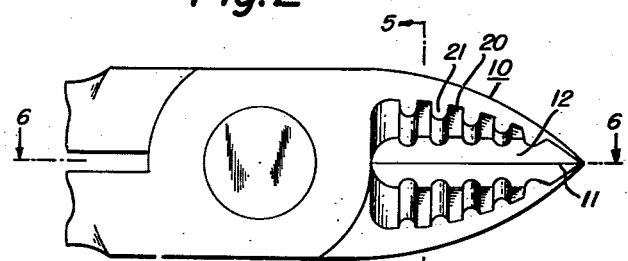
Figure 4 is a plan view of the jaw area only of the cutting tool as prepared prior to placing the yieldable gripping material in the hollowed out jaw thereof.
Figure 5:
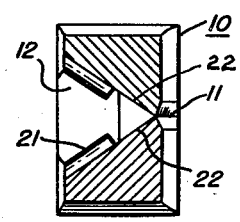
Figure 5 is a section taken along the line 5—5 of Figure 4.
Figure 6:
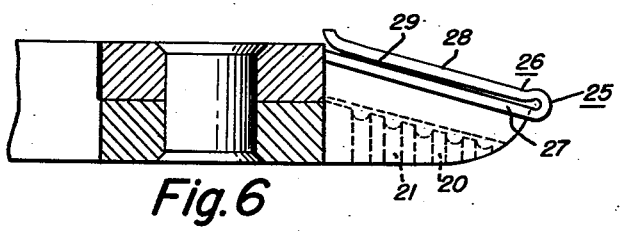
Figure 6 is a section taken along the line 6—6 of Figure 4 and therefore is in effect a side view of one jaw only in the unfilled condition, with an improved divider and forming device positioned therein to aid in proper forming of the yieldable material.

In the drawing the reference character 10 indicates the jaws of a wire cutting tool of conventional form, the cutting edges being indicated by the reference character 11. In tools of this character the jaws 10 are of a cross sectional contour as illustrated in Figures 2 and 3. One and corresponding sides of the respective jaws are slightly hollowed out forming pocket-like depressions 12.

In accordance with the present invention, use is made of yieldable gripping members 13 and 14, each composed of a body of resilient material, one for each jaw 10 as illustrated. These cooperating yieldable gripping members are employed to grip and hold therebetween an object severed by the tool itself.

These gripping members may, of course, be constructed from any suitable material possessing yieldable qualities, such as rubber-like material. Castable wholly synthetic materials are available and serve very well for this purpose. Many such castable materials are self-bonding to metal surfaces, or may readily be bonded by the use of coating materials placed on the metal prior to casting of the material against the metal surfaces. The gripping members may also vary in size and cross sectional contour to accommodate themselves to the particular tool with which they are to be used. In the specific embodiment illustrated, the gripping members are wholly arranged in the pocket-like depressions 12 of the jaws 10. Manifestly, by virtue of this arrangement, the gripping members 13 and 14 are wholly disposed within the confines of the jaws 10 and fully and adequately protected from injury or casual separation from the tool itself under all conditions. In other words, the gripping members 13 and 14 are housed within the jaws and cannot be brought into injurious contact with other objects, incident to careless handling of the tool, such, for instance, as when thrown around or into a tool box.

One specific improvement provided by this invention is embodied in the provision of the longitudinal channel 15 extending longitudinally along the mated cutting edges 11, as best illustrated in Figure 3 of the drawing. Channel 15 is composed of two individual grooves 16 and 17 molded in the gripping members 13 and 14 respectively. The effect upon the bond between the members 13 and 14 and the jaws of the tool at the cutting edge when cutting a workpiece member, may readily be visualized. At this point the section of the gripping members is quite thin and the deflection necessary to accommodate a workpiece is greatest in relationship to the total thickness of the material. Thus, the extreme deformation of the material gradually results in the separation of the yieldable material from the supporting jaws and results in starting a fault or separation which eventually produces complete failure of the entire bond and loss of the gripping materials from the jaws. By the provision of the channel 15, the gripping action of the members is preserved but the area of extreme stress is removed to thereby prevent the incipient separation and prolong the bond life of the gripping members to the jaws.

In all of the figures of the drawing, it will be seen that a plurality of lateral grooves 20 with resultant ridges 21 therebetween are provided in the area of the cutting jaws within the pocket depression 12. Gently rolling flutes have been found to greatly increase the surface area and thereby provide greater bonding strength between the gripping members and the jaws, but the best bond has been found to be produced by more sharply cut grooves in the nature of serrations. Actual undercutting of the grooves 20 may be provided if desired, but has been found to be unnecessary. Removal of the extreme stress concentration area by the provision of the channel 15, and the increase of the bonding area and the interlocking nature of the bond produced by the provision of the grooves 20 and ridges 21, has been found to be quite sufficient to give satisfactory bonding life.

Because of the adaptability of this invention to various types of cutting tools, the invention could possibly be explained by illustrating a diagrammatic jaw or cutting edge. However, the first use of the invention was made with cutting pliers, and therefore is illustrated with the jaw body structure of such a tool. In each jaw 10, a face wall 22 slopes away from the cutting edge 11. A gripping body of resilient material is carried by the wall 22. This body of resilient material is moveable toward an opposing surface in order to provide holding action. The opposing surface is usually of another such body, but may very well be a rigid surface. Therefore, the body has a surface which may be referred to as a top surface or preferably as a gripping surface which is indicated by the reference character 23 on gripping member 13 and by 24 on gripping member 14. Whatever term may be adopted to designate such surface, and whatever its form, its function is clear. It must move with the cutting jaw and cooperate with some other surface to grip a work piece severed by the edge 11.

The feature provided by this invention is the provision of a gripping pad of improved characteristics. The pad is placed as close to the cutting edge as practical in order to catch and hold the smallest particles that may be severed by the edges 11. It has been found that a small, definite, trough space along the cutting edge will allow the pad to catch even the smallest cut pieces, and yet not be unduly stressed by the cutting action. It is the extreme stress per unit of area at the cutting edge that has caused rapid deterioration in prior inferior devices of similar general appearance. Still the small cut pieces are the dangerous pieces and must be retained. The preferred embodiment as illustrated accomplishes these objectives by the spacing of the resilient body from the cutting edge. Therefore, referring to gripping member 13 as an example, this member has three basic surfaces of prime importance. First, an anchored surface 31 is so designated because it is secured to the wall 22 and thus anchors the pad 13 in place. Secondly, the gripping surface 23 begins a distance from the face wall 22 and a distance from cutting edge 11. Thirdly, a bridging surface 33 extends intermediate the gripping surface 23 and the anchored surface 31. This bridging surface of the pad, together with a portion of the jaw anchoring surface, defines a trough adjacent the cutting edge. In this illustrated tool, as will be the case with most uses of the invention, this bridging surface ends at a flat plane plateau 23, as shown in Figure 3. In Figure 3 the plateau surfaces 23 and 24 meet over most of their length and part near the cutting edge, as described, to avoid extending fully to the cutting edge. Mutually, then, the surfaces 33 and 34 define a recess groove 15 extending adjacent the cutting edges 11.

The surfaces 33 and 34 may conveniently be said to begin at the face walls 22 of the jaws a distance from the cutting edges and to extend to their respective plateaus, 23 and 24. The plateau 23 may be flat as shown in the drawing, or some other form, but whatever its form may be it must cooperate with some other surface in producing a work piece holding grip action upon a work piece.

In the preferred embodiment of the invention as illustrated, the resilient material forming the gripping members is carried by the face wall within the pocket depression 12, and the resilient material and at least a portion of that face wall have interfitting locking surfaces bonded together.

Figure 8:
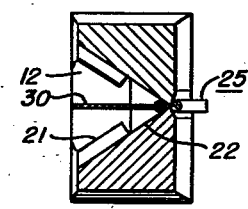
Figure 7:
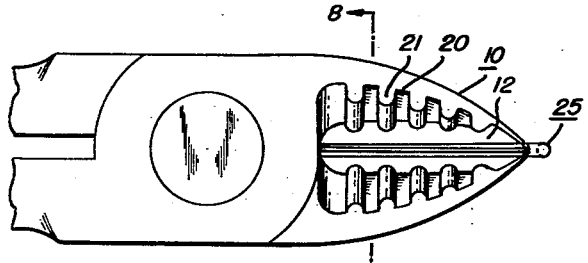
Figure 7 is a plan view in the jaw area only of the tool with the divider and forming device therein; and, Figure 8 is a section taken along the line 8—8 of Figure 7.

Although the gripping members 13 and 14 may be molded individually and bonded onto the face walls 22 within the depression 12, a vastly superior and improved method is illustrated herein, and made possible by a divider and forming device 25. The divider and forming device for use in molding yieldable material gripping members in hollowed out jaws of a cutting tool having side cutting edges comprises a wire rod portion 26 bent back upon itself to present a longitudinal channel forming portion 27 and a retainer portion 28. The channel forming portion and the retainer portion have a space 29 to permit the cutting edges 11 to close together into the space 29 with a wedge grip action and thereby hold the forming device 25 in fixed relationship between the jaws 10 as illustrated best in Figure 8 of the drawing. A plate member 30 extends laterally from the longitudinal axis of the portion 27 and forms a dividing plane between the jaws 10. The yieldable resilient material is then molded into the pocket depression 12 around the plate 30 and the section 27 of the wire rod. Castable resin materials, rubber latex, or any other suitable similar material which can be cast or molded into the pocket depression 12 will suffice for this purpose. Self setting materials or heat setting materials may be employed as desired. In any event, the material thus molded into the depression 12 will closely and intimately associate itself with all surfaces and will be tightly bonded thereto. As previously mentioned, undercut grooves 20 may be employed if desired and thus further aid in anchoring the resilient materail. After being thus molded and cured in place, the jaws 10 may be opened and the separate gripping members 13 and 14 will each adhere to its respective jaw. The plate 30 is treated to prevent adherence thereto. Further, the plate 30 is quite thin, and therefore will produce an acceptable clearance.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. A wire cutter comprising, a pair of levers, each lever having a first end and a second end, pivotal connecting means operatively interconnecting the levers intermediate the ends of the levers, the first ends of the levers at one side of the pivot forming handles for operating the wire cutter, jaws carried at the second ends of the levers at the opposite side of the pivot, the jaws being provided with mating cutting edges, a recessed surface on the side of each of the jaws extending to the said cutting edge of the jaw, said recessed surfaces jointly forming a recess, cushion gripping means on each said recessed surface having a gripping surface extending approximately to the cutting edge, each of said cushion means on its gripping surface being provided with a recess adjacent the cutting edge, said grooves jointly forming a channel whereby distortion of the cushion in the region of the cutting surface is eliminated.

2. A wire cutter comprising, a pair of levers, each lever having a first end and a second end, pivotal connecting means operatively interconnecting the levers intermediate the ends of the levers, the first ends of the levers at one side of the pivot forming handles for operating the wire cutter, jaws carried at the second ends of the levers at the opposite side of the pivot, the jaws being provided with mating cutting edges, a recessed surface on the side of each of the jaws extending to the said cutting edge of the jaw, the recessed surfaces being provided with outwardly extending ribs, said recessed surfaces jointly forming a recess, cushion gripping means on each said recessed surface having a gripping surface extending approximately to the cutting edge, each of said cushion means on its gripping surface being provided with a groove adjacent the cutting edge, said grooves jointly forming a channel whereby distortion of the cushion in the region of the cutting surface is eliminated.

References Cited in the file of this patent

UNITED STATES PATENTS

| | | |
|---|---|---|
| 108,091 | Barbour | Oct. 11, 1870 |
| 289,116 | McDonald | Nov. 27, 1883 |
| 1,862,556 | Helhaven | June 14, 1932 |
| 2,302,810 | Steegmuller | Nov. 24, 1942 |
| 2,431,970 | Swartz | Dec. 2, 1947 |
| 2,700,186 | Stover | Jan. 25, 1955 |
| 2,719,331 | Harris | Oct. 4, 1955 |